United States Patent [19]

Watson

[11] Patent Number: 4,853,499
[45] Date of Patent: Aug. 1, 1989

[54] GROUND SWITCHING TECHNIQUE FOR SILKSCREENED DIGITIZER GRIDS

[75] Inventor: James S. Watson, Phoenix, Ariz.
[73] Assignee: Calcomp Inc., Anaheim, Calif.
[21] Appl. No.: 283,509
[22] Filed: Dec. 12, 1988
[51] Int. Cl.$^4$ ............................................. G08C 21/00
[52] U.S. Cl. ..................................................... 178/19
[58] Field of Search ..................... 178/18, 19; 382/13

[56] References Cited

U.S. PATENT DOCUMENTS 4,649,232  3/1987  Nakamura ............................ 178/18

Primary Examiner—Stafford D. Schreyer
Attorney, Agent, or Firm—Donald A. Streck; William F. Porter, Jr.

[57] ABSTRACT

A method and associated circuitry for use in an electromagnetic digitizer having a plurality of first grid conductors connected from a first multiplexer controlled by a first enable input to ground and a plurality of second grid conductors connected from a second multiplexer controlled by a second enable input to ground and crossing over the first grid conductors at multiple points for eliminating errors caused by capacitively coupled signals between the grid conductors at the cross over points. The method comprises, connecting a first switch having a control input for switching the first switch to a closed position in series with the connection of the first grid conductors to ground; connecting a second switch having a control input for switching the second switch to a closed position in series with the connection of the second grid conductors to ground; applying the first enable input simultaneously to the control input of the second switch and the first multiplexer whereby the connection to ground of the second grid conductors is broken when the first multiplexer is enabled; and, applying the second enable input simultaneously to the control input of the first switch and the second multiplexer whereby the connection to ground of the first grid conductors is broken when the second multiplexer is enabled.

5 Claims, 2 Drawing Sheets

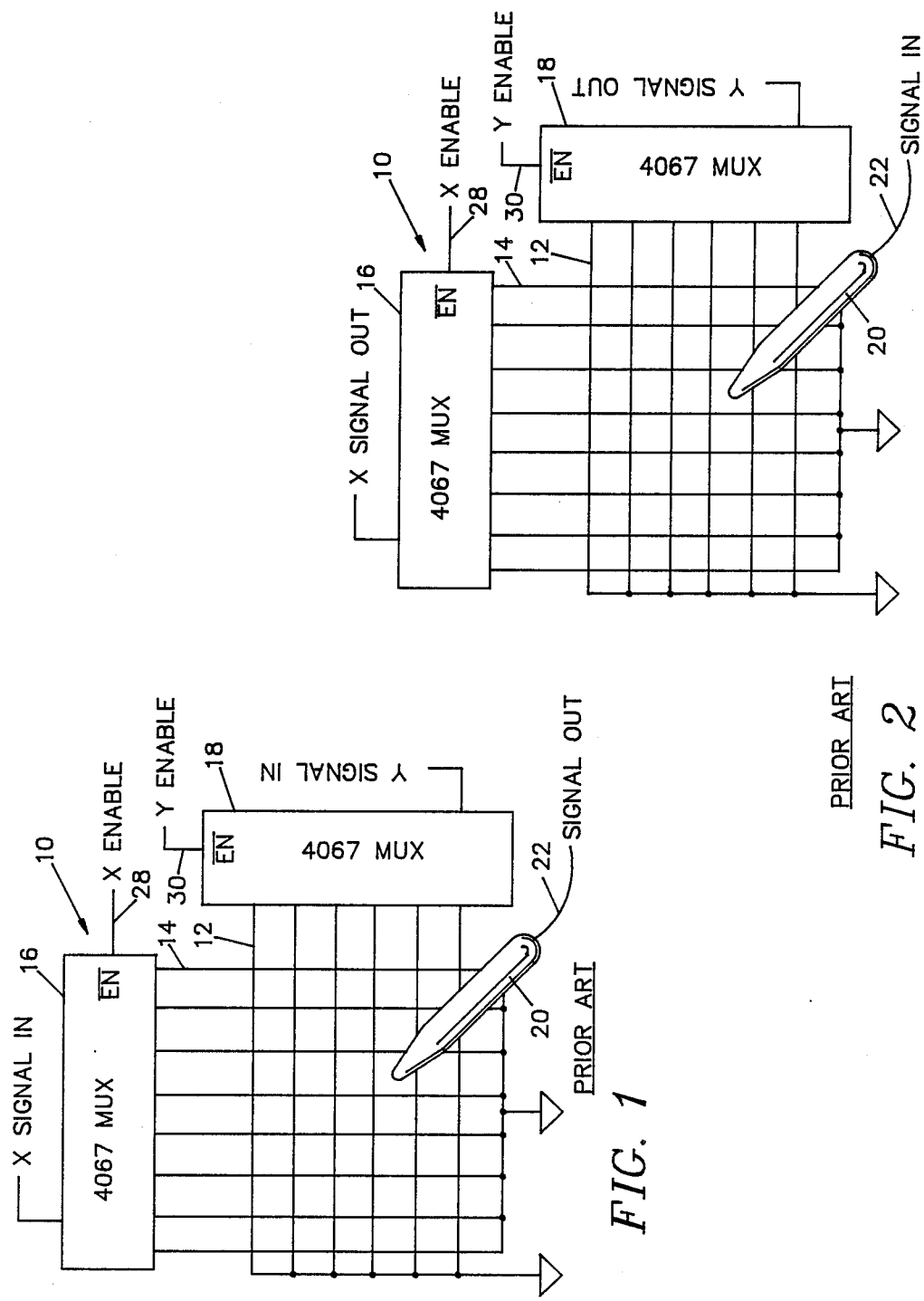

GROUND SWITCHING TECHNIQUE FOR SILKSCREENED DIGITIZER GRIDS

BACKGROUND OF THE INVENTION

The present invention relates to digitizers and, more particularly, in an electromagnetic digitizer having a plurality of first grid conductors connected from a first multiplexer controlled by a first enable input to ground and a plurality of second grid conductors connected from a second multiplexer controlled by a second enable input to ground and crossing over the first grid conductors at multiple points, to the improved method of operation for eliminating errors caused by capacitively coupled signals between the grid conductors at the cross over points comprising the steps of, connecting a first switching means having a control input for switching the first switching means to a closed position in series with the connection of the first grid conductors to ground; connecting a second switching means having a control input for switching the second switching means to a closed position in series with the connection of the second grid conductors to ground; applying the first enable input simultaneously to the control input of the second switching means and the first multiplexer whereby the connection to ground of the second grid conductors is broken when the first multiplexer is enabled by the first enable input; and, applying the second enable input simultaneously to the control input of the first switching means and the second multiplexer whereby the connection to ground of the first grid conductors is broken when the second multiplexer is enabled by the second enable input.

Digitizing devices or "digitizers" that provide an input to a computer of the x,y coordinates of a stylus on a digitizing surface have gained great popularity. In great part, this is because of the rapid advancements in computer aided drafting (CAD) systems, and the like. Using a digitizer tablet, an engineer or draftsman can quickly and accurately input drawing information to the system.

Like other aspects of computers and their supporting peripheral devices, the art of digitizers has advanced rapidly and has taken many paths. Their ability to work faster and more accurately has also been challenged by the advancements in computer technology. As the computers generally available for use with CAD systems, and the like, became faster and faster, the users demanded that their input devices (including digitizer tablets) be able to provide inputs at a corresponding level of speed while maintaining high accuracy. As a result, some more crude approaches to the digitizing problem fell by the wayside.

Electromagnetic digitizers have proved to be quite adaptable to the high speed, high accuracy demands of modern computing. The first electromagnetic digitizers operated in the manner depicted in FIG. 1, i.e. in a grid active and stylus passive mode. The tablet portion 10 contains a grid of horizontal Y conductors 12 and vertical X conductors 14. Under the control of an X multiplexer 16 and a Y multiplexer 18 selectively enabled by the computer using the digitizer, an alternating current signal is repeatedly applied in a strobe fashion through first the Y conductors 12 and X conductors 14. The current flowing through the conductors 12, 14 causes an alternating magnetic field to be developed about them in a manner well known in the art. The stylus 20 contains a small coil of conductor in its tip connected to the conductors in connecting cable 22. As a consequence, the alternating magnetic field from the conductors 12, 14 flows through the adjacent coil and induces a voltage signal in the coil which is sensed on the cable 22 by the computer to which it is operably connected. Since the computer is driving the signals into the conductors 12, 14, it can tell the position of the tip of the stylus 20 from the time of ocurrence of the induced signal on the cable 22. This explanation is, of course, greatly simplified; but, is sufficient for the purposes of establishing the background and need for the present invention.

It is also known that similar performance can be obtained by operating the tablet portion 10 in a passive mode from an active stylus. Thus, as depicted in FIG. 2, the coil within the tip of the stylus 20 has an alternating current applied thereto which causes an alternating magnetic field surrounding the tip of the stylus 20. As the stylus 20 is moved over the conductors 12, 14 the alternating magnetic field surrounding the tip of the stylus 20 induces a signal into the adjacent conductors. The signal is strongest in those conductors 12, 14 on either side of the tip and gets weaker in the more distant conductors 12, 14. The voltages on conductors 12, 14 are sampled for any signal induced therein by the multiplexers 16, 18. Again, this explanation is greatly simplified but sufficient for the purposes.

As indicated in the drawings, in both the active and passive approaches of FIGS. 1 and 2 the conductors 12, 14 are connected on one end to the multiplexers 16, 18 and to a common ground on the other end so as to complete the circuit through the conductors 12, 14. In other prior art digitizers operating in other manners, it is not uncommon to reverse the approach and switch the connections to ground with the other ends connected to a common signal source. That is simply a matter of choice as to where to put the series switching connection in each line. With prior art construction techniques employing the conductors 12, 14 formed by an etching process on a printed circuit board, or physical conductors attached to a substrate, or flexible conductors bonded to a flexible substrate such as Mylar, or the like, the standard prior art approach to switching the conductors 12, 14 and providing an electrical connection therethrough worked without noticeable problems.

The accuracy of a digitizer is, in large part, determined by the placement accuracy of conductors 12, 14 and by the spacing between conductors 12, 14 as compared to the size of the coil in the tip of the stylus 20. If the coil can be made smaller and the conductors can be made thinner and closer together, the accuracy can be improved. In recent research into the accuracy of ink-on-glass digitizer surfaces, it was discovered that smaller spacing between the overlapped conductors 12, 14 corresponding to the dielectric between the conductors resulted in an unexpected degradation in the resultant accuracy. The printed runs are .05 inch wide and separated from the other axis by 0.001 inch of dielectric material. Since the runs of one axis cross over those of the other axis many times, there is a great opportunity for capacitive coupling from one axis to the other—particularly at the higher sampling frequencies now being employed. Additionally, the grid structure employed is one where each conductor is disposed across the tablet twice; that is, a conductor crosses the tablet to the opposite side, traverses the edge to a displaced position, and then recrosses the tablet in a spaced parallel position to that of the first crossing. This technique (which is not part of the novelty of the present invention; but, which contributes greatly to the problem solved thereby) allows half as many conductors to be used for a given conductor spacing since each conductor appears twice. In any event, the resulting errors tended to be of a magnitude of the order of 2 to 3 mils and tended to occur particularly where the conductors begin crossing the grid of the tablet in the opposite direction.

Wherefore, it is the object of the present invention to provide a technique for the operation of an electromagnetic digitizer in a tablet passive, stylus active mode which allows the use of ink-on-glass construction, and the like, without causing the introduction of errors from capacitively coupled signals between the grid conductors at cross over points.

Other objects and benefits of the present invention will become apparent from the description which follows hereinafter when taken in conjunction with the drawing figures which accompany it.

SUMMARY

The foregoing object has been achieved in an electromagnetic digitizer having a plurality of first grid conductors connected from a first multiplexer controlled by a first enable input to ground and a plurality of second grid conductors connected from a second multiplexer controlled by a second enable input to ground and crossing over the first grid conductors at multiple points, by the improvement of the present invention for eliminating errors caused by capacitively coupled signals between the grid conductors at the cross over points comprising, first switching means connected in series with the connection of the first grid conductors to ground and including a control input connected to the first enable input for breaking connection to ground of the second grid conductors when the first multiplexer is enabled by the first enable input; and, second switching means connected in series with the connection of the second grid conductors to ground and including a control input connected to the second enable input for breaking connection to ground of the first grid conductors when the second multiplexer is enabled by the second enable input. In the preferred embodiment, the first and second switching means each comprises a switching transistor.

DESCRIPTION OF THE DRAWINGS

FIG. 1 is a simplified drawing of an electromagnetic digitizer according to the prior art operating in a grid-active, stylus passive mode.

FIG. 2 is a simplified drawing of an electromagnetic digitizer according to the prior art operating in a grid-passive, stylus active mode.

Figure 3:
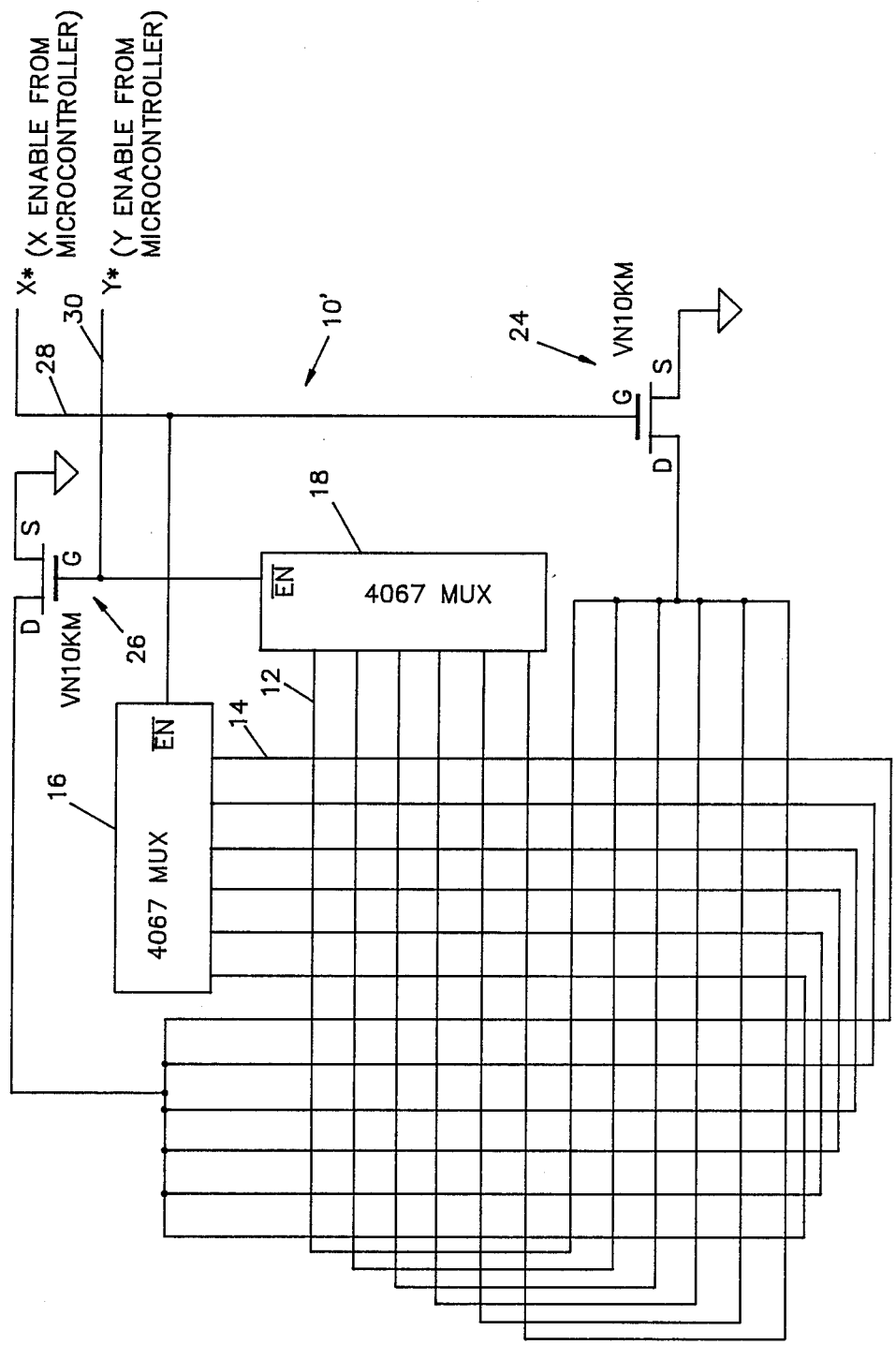
FIG. 3 is a simplified drawing of an electromagnetic digitizer tablet adapted for operating in a grid-passive, stylus active mode according to the present invention.

DESCRIPTION OF THE PREFERRED EMBODIMENT:

The preferred modification to the prior art tablet construction described above employing each conductor twice and its manner of operation according to the present invention is shown in FIG. 3. Only those portions necessary to a description of the present invention are shown in the interest of simplicity. The present invention is based on the proposition of eliminating the circuit connection to ground of crossing conductors (12 or 14) that are not presently being sampled. By eliminating the connection to ground except when needed, there is no place for capacitively coupled signals to go and, therefore, their interference is eliminated. This objective was accomplished by the circuit of FIG. 3 (which is a modification of the above-described "loopback grid" structure—which can also be seen, for example, in U.S. Pat. No. 4,734,546) wherein a pair of switching transistors 24, 26 are connected in series with respective ones of the ground connections of the axes. Thus, the X conductors 14 are connected to ground through the switching transistor 26 while the Y conductors 12 are connected to ground through the switching transistor 24. As the active low enable signal on input conductors 28, 30 is applied to the multiplexer 16, 18 of an axis, it is simultaneously applied to and turns off the associated switching transistor 24, 26, thus removing the connection to ground for the other axis. At times when neither of the multiplexers 16, 18 is enabled, the connections to ground are made for both axes. In this regard, the switching transistors 24, 26 act as normally closed switches which are switched to their open state by the active low enable signal. In tested embodiments, the above-described circuit addition and its method of operation were found to successfully eliminate the errors caused by signals capacitively coupled between the grid conductors at cross over points in digitizers employing ink-on-glass construction of the loopback grid type.

Wherefore, having thus described the present invention, what is claimed is:

1. In an electromagnetic digitizer having a plurality of first grid conductors connected from a first multiplexer controlled by a first enable input to ground and a plurality of second grid conductors connected from a second multiplexer controlled by a second enable input to ground and crossing over the first grid conductors at multiple points, the improvement for eliminating errors caused by capacitively coupled signals between the grid conductors at the cross over points comprising:
    (a) first switching means connected in series with the connection of the first grid conductors to ground and including a control input for breaking the connection to ground of the second grid conductors when the first multiplexer is enabled by the first enable input; and,
    (b) second switching means connected in series with the connection of the second grid conductors to ground and including a control input for breaking the connection to ground of the first grid conductors when the second multiplexer is enabled by the second enable input.

2. The improvement to an electromagnetic digitizer of claim 1 wherein:
    said first and second switching means each comprises a switching transistor.

3. In an electromagnetic digitizer having a plurality of first grid conductors connected from a first multiplexer controlled by a first enable input to ground and a plurality of second grid conductors connected from a second multiplexer controlled by a second enable input to ground and crossing over the first grid conductors at multiple points, the improved method of operation for eliminating errors caused by capacitively coupled signals between the grid conductors at the cross over points comprising the steps of:
    (a) connecting a first switching means having a control input for switching the first switching means between an open and a closed position in series with the connection of the first grid conductors to ground;
(b) connecting a second switching means having a control input for switching the second switching means between an open and a closed position in series with the connection of the second grid conductors to ground;
(c) applying the first enable input simultaneously to the control input of the second switching means and the first multiplexer whereby the connection to ground of the second grid conductors is broken when the first multiplexer is enabled by the first enable input; and,
(d) applying the second enable input simultaneously to the control input of the first switching means and the second multiplexer whereby the connection to ground of the first grid conductors is broken when the second multiplexer is enabled by the second enable input.

4. In an electromagnetic digitizer of the loopback grid variety having a plurality of first grid conductors connected to a first multiplexer controlled by a first enable input and crossing a working surface of the digitizer twice to a ground connection and a plurality of second grid conductors connected to a second multiplexer controlled by a second enable input and crossing the working surface of the digitizer twice while crossing over the first grid conductors at multiple points to a ground connection, the improvement for eliminating errors caused by capacitively coupled signals between the grid conductors at cross over points where the conductors turn to recross the working surface of the tablet comprising:
(a) first switching means connected in series with a connection of the first grid conductors to ground disposed after their second crossing of the working surface and including a control input for breaking said connection to ground of the second grid conductors when the first multiplexer is enabled by the first enable input; and,
(b) second switching means connected in series with a connection of the second grid conductors to ground disposed after their second crossing of the working surface and including a control input for breaking said connection to ground of the first grid conductors when the second multiplexer is enabled by the second enable input.

5. The improvement to a loopback grid electromagnetic digitizer of claim 4 wherein:
said first and second switching means each comprises a switching transistor.

* * * * *